Oct. 2, 1951
J. I. SPANICH
2,569,737
MECHANISM FOR APPLYING BRAKE LININGS
Filed Dec. 10, 1949
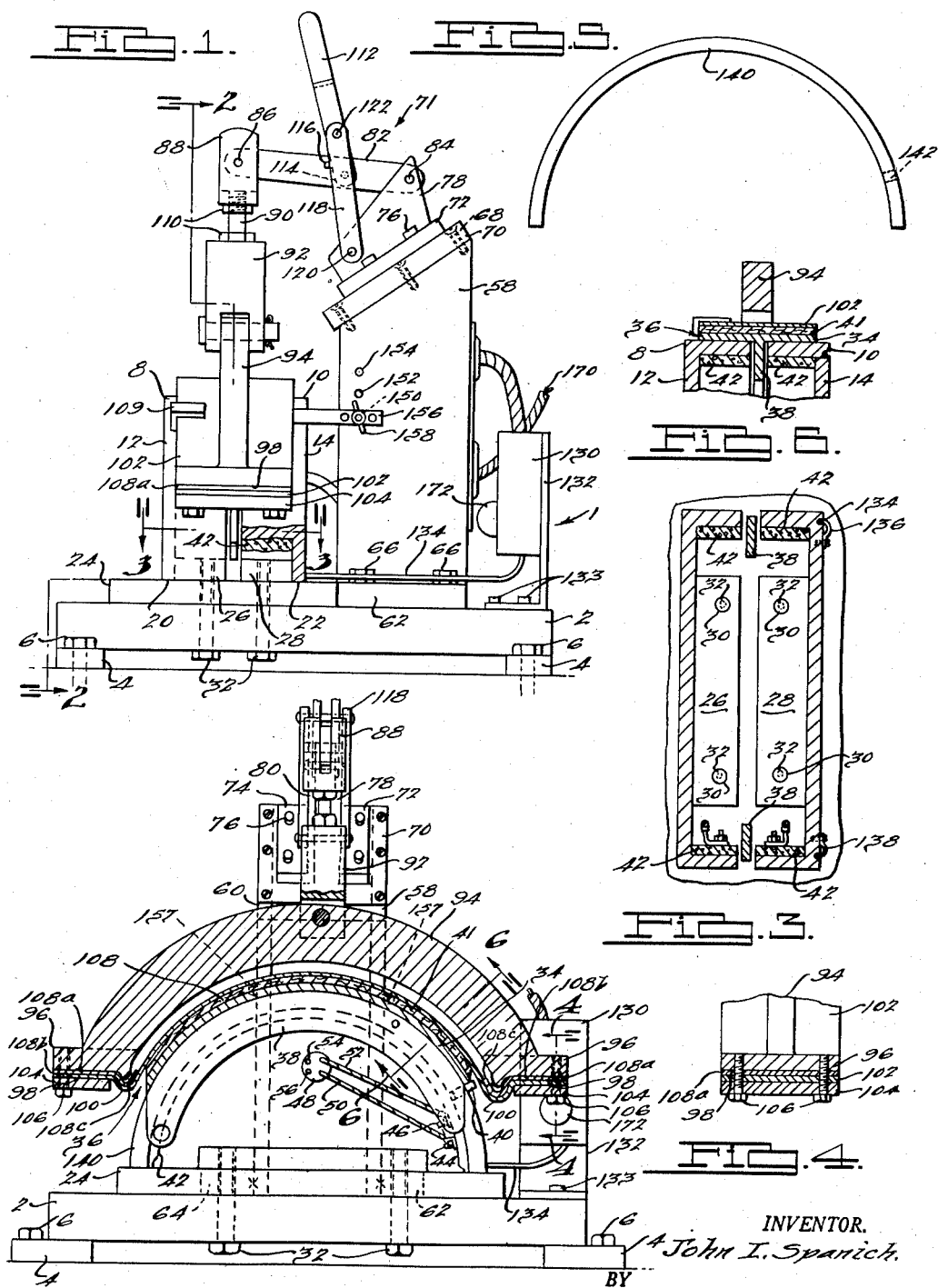
INVENTOR.
John I. Spanich.
BY
Harness, Dickey & Pierce.
ATTORNEYS.

Patented Oct. 2, 1951

2,569,737

UNITED STATES PATENT OFFICE 2,569,737

MECHANISM FOR APPLYING BRAKE LININGS

John I. Spanich, Plymouth, Mich.

Application December 10, 1949, Serial No. 132,247
In Canada October 25, 1948

24 Claims. (Cl. 154—1)

This invention relates generally to mechanisms for cementing elements under the influence of pressure and heat and is particularly adapted, among other uses, for the cementing of brake linings to brake shoes. This application is a continuation-in-part of my copending application, Serial No. 768,178 filed August 12, 1947 for Mechanism for Applying Brake Linings now abandoned.

Objects of this invention are to provide a simple, economical, and easily manufactured mechanism of the type described; to provide such a mechanism which is simple and trouble-free in its operation; to provide such a mechanism which may be readily altered to accommodate various sizes of brake shoes; to provide such a mechanism which will maintain a desired clamping pressure during the curing of the adhesive, and to generally improve mechanisms of the type described.

Other and more specific objects of the invention will become apparent from the following specification, the drawings relating thereto, and from the claims hereinafter set forth.

In the drawings in which like numerals are used throughout the various views to designate like parts;

Figure 1 is a view in side elevation of a mechanism for applying brake linings embodying the invention;

Fig. 2 is a view taken substantially along the line 2—2 of Fig. 1 and looking in the direction of the arrows;

Fig. 3 is a view taken substantially along the line 3—3 of Fig. 1 and looking in the direction of the arrows;

Fig. 4 is a view taken substantially along the line 4—4 of Fig. 2;

Fig. 5 is a view of an adapter member for use with the mechanism whereby it is adapted for brake shoes of a different diameter; and Fig. 6 is a view taken substantially along the line 6—6 of Fig. 2.

Although the present invention is specifically illustrated as being applicable to cement brake linings to brake shoes, as for example in carrying out a commercial cementing process known by the trade name Cycleweld and although only a single specific embodiment of the invention is set forth, it will be appreciated by those skilled in the art that in its generic aspects it has other uses and various modifications may be made in the structure within the scope of the present invention. The drawings are therefore to be taken as illustrative rather than as limitative, and the scope of the invention is to be limited only by the hereinafter appended claims.

Referring to the drawings, the numeral 1 indicates generally a brake lining-applying mechanism having a substantially rectangular plate-like base member 2 to which has been welded, in each of its four corners, feet 4 having apertures therethrough for receiving, if desired, bolts or lag screws 6 for suitably securing the mechanism 1 to any fixed support. A pair of hollow substantially semicylindrical housing members or shoes 8 and 10 forming one jaw member of a clamp having end walls 12 and 14 respectively are arranged with their open walls 16 and 18 slightly spaced apart and facing one another with their diametrically extending walls 20 and 22 abutting against a flat platelike member 24 seating against the upper surface of the base member 2. Flanges or bosses 26 and 28 extend inwardly from the walls 12 and 14 toward the walls 16 and 18 respectively. These flanges 26 and 28 have spaced internally threaded apertures 30 for receiving cap screws 32 which extend upwardly through aligned apertures in the members 2 and 24 and hold the semicylindrical members 8 and 10 in fixed position with respect to the plates 2 and 24.

The outer radius of the shoes or anvils 8 and 10 is preferably equal to the radius of the under surface of the flange 34 of the smallest brake shoe 36 which the mechanism is designed to accommodate. A removable pin 40 received within a radially extending aperture of the rearward shoe 10 locates one end of the shoe 36 whereby it is positioned substantially centrally of the peripheral surface of the members 8 and 10. Preferably this pin 40 extends outwardly of the surface slightly more than the thickness of the brake-shoe flange 34 to locate one end of the brake lining material 41.

Strip heaters 42 having terminals 44 and 46 are initially formed to substantially the same contours as the contours of the inner surfaces of the shoes 8 and 10 in which the heaters are housed and have a length just sufficient so that when they are positioned in place within the shoes 8 and 10 and the shoes 8 and 10 are held by the cap screws 32 against the member 24, the ends of the heater strips 42 abut the top surface of the member 24 and are securely held to the members 8 and 10. The wall 14 has an aperture 48 extending therethrough through which the lead wires 50, 52, 54 and 56 extend. The lead wires 50 and 52 are connected to the terminals 44 and 46 of the heater 42 associated with the shoe 10, while lead wires 54 and 56 are connected to the terminals of the heater 42 associated with the shoe 8.

Located rearwardly of the shoes 8 and 10 and the platelike member 24 upon which they rest are a pair of spaced perpendicularly extending plate members 58 and 60. The lower end of these members are welded to rectangular steel blocks 62 and 64 respectively. The blocks 62 and 64 are held by suitable means such as cap screws 66 to the top surface of the platelike member 2. The upper ends of the plate members 58 and 60 extend diagonally with respect to the top surface of the platelike member 2. A connecting platelike member 70 secured to this top surface as by screws 68 forms a top support for the members 58 and 60.

A clamping mechanism 71 is carried by the member 70 and comprises a pair of L-shaped members 72 and 74, each having an angle face suitably secured to the top surface of the member 70 as by screws 76 and each having another angle face or flange 78 and 80 extending outwardly of the member 70 in spaced relation to each other. A clamping lever 82 is fulcrumed at one end portion on a pin 84 which extends between the flanges 78 and 80. The other end of the clamping lever 82 is secured as by a pin 86 within a bifurcated end portion of a connecting member 88. The member 88 is provided with an internally threaded aperture for receiving the upper end of an adjusting screw 90 having its lower end portion screw-threadedly received within a second connecting member 92 which receives within its downwardly extending bifurcated end portion a downwardly facing yoke member 94. A handle member 112 is bifurcated at its lower end and the bifurcated lower end portion straddles the clamping lever 82 intermediate its end portions and is pivoted thereon as by means of a pivot pin 114. Forward movement of the handle 112 (counterclockwise) is limited by engagement of the member 112 with a pin 116 carried by the lever 82 and permits movement of the handle member 112 just beyond an overcenter position for locking the mechanism 71 in a clamping position. A pair of links 118 are pivotally connected to the upwardly extending flange portions 78 and 80 as by a pivot pin 120, and the upper end portions of the links 118 are pivotally secured to the bifurcated end portions of the handle 112 as by a pin 122.

The yoke member 94 has an internal radius which is substantially greater than the external radius of the shoes 8 and 10 and of the brake shoes 36 which may be carried thereby. Each end of the yoke member 94 carries a pad 96 which has a lower surface 98 extending substantially parallel to the top surface of the platelike member 24. The adjacent ends of the surfaces 98 terminate in downwardly extending substantially semicylindrical surfaces 100. A flexible, somewhat resilient stainless steel strip member 102 is clamped at either end to the surfaces 100 by clamping blocks 104 suitably held to the blocks 96 by means of cap screws 106 and forming a second jaw member of the clamp. In order to provide a substantially constant force acting on the brake lining material 41 to hold it to the brake shoe 36 the yoke 94 is provided with resilient members 108a which have platelike portions 108b clamped between the pads 96 and the adjacent portions of strip member 102. The members 108a have substantially semicylindrical portions 108c which are normally positioned outwardly of the portion 100. The member 102 extends over the semicylindrical portions 108c and extends in a substantially semicylindrical form 108 downwardly from the internal diameter of the yoke 94. When the mechanism 71 is in clamping position, the strip member 102 securely clamps a strip of brake lining material 41 to the upper surface of the flange 34 of the brake shoe 36 which is held by the semicylindrical members 8 and 10. A pair of L-shaped locators 109 (one only of which is shown) are welded to the top surface of the strip member 102 at either side of the vertical centerline of the shoes 8. The downwardly extending rightangle portion thereof extends toward but does not engage the peripheral surface of the shoe 8 whereby the forward edge of the strip member 102 is aligned with the forward edge of the brake-shoe flange 34 and lining material 41.

The actual pressure exerted to hold the lining material 41 against the brake shoe 36 may be controlled by the adjustment of the U-shaped members 88 and 92 along the connecting rod or screw 90 and which may be held in adjusted position by means of lock nuts 110.

With the clamping mechanism 71 in the position as shown in Fig. 1, yoke 94 is held in clamping position to hold the brake-lining material 41 securely against the upper surface of the brake-shoe flange 34. With the yoke 94 thusly clamped, the portions 108c will be flexed somewhat toward the portions 100 and exert a downward force on the strip member 102 for applying a clamping force to hold the brake lining material 41 against the brake shoe 36. To release the clamping mechanism 71, the handle 112 is rotated clockwise (see Fig. 1) so that the pin 122 will pass to the right of the line of centers of the pins 120, 114 after which continued clockwise rotation of the handle 112 will tend to rotate the lever 82 in a clockwise direction, thereby lifting the yoke 94 upwardly and rearwardly. Subsequent to releasing the yoke 94 from its clamping relation, it may also be rotated about the pivot pin 86 whereby the yoke 94 is moved away out of position to allow clear access to insert and remove the brake shoes and the brake lining to and from the semicylindrical members 8 and 10.

Since the cementing material which is applied between the brake-lining material 41 and the brake-shoe flange 34 is usually thermosetting, heat must be applied so that the temperature is raised sufficiently to permit the cementing material to tightly bend the brake-lining material 41 to the brake-shoe flange 34. This heat is provided by means of the above-mentioned heaters 42 which underlie the semicircular members 8 and 10 and are held tightly thereto because of the engagement of their end portions with the top surface of the platelike member 24. Temperature of the shoes 8 and 10 is controlled by a thermostat 130 carried adjacent one rear corner of the platelike member 2 by means of an angle bracket 132 held as by screws 133. A capillary control tube 134 of the thermostat 130 extends along the wall 14 of the shoe 10 and is received within a circumferential aperture 136 and held therein by clips 138. The thermostat 130 is suitably connected in electrical circuit with the heaters 42 in any well-known manner whereby electrical energy will be applied to the heaters 42 by the lead wires 50, 52, 54 and 56 whenever the thermostat 130 is dissatisfied and will be discontinued when the thermostat 130 is satisfied to maintain the temperature of the shoes 8 and 10 within desired temperature limits.

Since the radius of all brake shoes 36 is not constant and it is desired to use the brake lining-applying mechanism for brake shoes of various sizes, a series of hollow semicylindrical members such as illustrated by reference character 140 in Fig. 5 are provided. The internal diameter of all of the various shoes, similar to those illustrated in Fig. 5, is the same as the external diameter of the members 8 and 10, while the external diameters of the adapter members 140 are made to agree with the internal diameters of the flanges 34 of the brake shoes 36 which are to have linings applied thereto. When it is desired to change the size of the brake shoe, the pin 40 is withdrawn, the desired one of the adapter members 140 is selected and placed around the outside of the members 8 and 10 and the pin 40 then reinserted in an aperture 142 in the adapted ring which is provided for this purpose. When various adapters 140 are used, yokes 94 and resilient member 102 of corresponding size but of the same construction as shown may be and preferably are used.

The vertically extending platelike members 58 and 60 are provided with a series of internally screw-threaded apertures 150, 152 and 154, three being shown since the illustrated machine has been designed to operate for three different sizes of brake shoes, but which of course could be of any number. A pair of locating pins 156 and 157 each have a plurality of holes extending therethrough, three holes being shown in the present instance, since the present machine is designed to operate with three different widths of flanges 34 of brake shoes 36. Wing nut screws 158 extend through the proper one of the apertures of the pins 156 and 157 and thread into the proper one of the internally screw-threaded apertures 150, 152 and 154 so that the outwardly extending end portion of the member 156 will lie on the peripheral surface of the shoe 10 on the adapter 140 associated therewith and engage the rearward edge of the brake-shoe flange 34 for locating the brake shoe 36 on the members 8 and 10 or of the adapter member 140 as the case may be.

It is believed that the remainder of the details of construction may be best understood by a reference to the operation of the mechanism which is as follows:

The power-supply cable 170 is attached to a convenient source of electrical energy. Electrical current flows under control of the thermostat 130 through the heaters 42 whereby the members 8 and 10 are heated to the desired temperature. When the desired temperature is reached, the thermostat 130 will discontinue flow of electrical energy to the heaters 42 until such time as the temperatures of the members 8 and 10 decrease to the lower temperature limit, at which time the thermostat 130 will again energize the heaters 42 to return the temperature of the members 8 and 10 to the upper temperature limit. The proper ones, if any, of the adapter members 140 are placed one about each of the members 8 and 10, and the proper yoke 94 is selected. Since all of these yokes are identical except as to the diameters, only one is shown. After the relative adjustments of the members 88 and 92 and the rod 90 are made and the lock nuts 110 lock them in this position, the handle 112 is moved to its extreme clockwise position and the brake shoe 36 which is to have the lining applied is placed on the shoes 8 and 10 or adapters 140, as the case may be, with its rib or web 38 extending downwardly between the surfaces 16 and 18 with its right-hand end in engagement with the locating pin 40 and its rear edge abutting the pins 156 and 157 which have been properly positioned by the nut screws 158. Next the brake lining material 41 which has been treated with the proper cementing material is placed on top of the flange 34. The yoke 94 is rotated about the pin 86 until it extends in a forward and downward direction, after which the handle 112 of the mechanism 71 is rotated forwardly to rotate the lever 82 counterclockwise. This movement of the mechanism 71 brings the locators 109 against the forward edge of the brake-shoe flange 34 and lining material 41 and the flexible strip 102 against the top surface of the brake-lining material 41. The material 41 is thereby aligned on the brake shoe 36 and securely clamped to the upper surface of the flange 34. By the use of the flexible member 102 for directly engaging the brake-lining material 41, any irregularity in the thickness of the brake lining or the contour of the flange 34 will be compensated. As stated above, upon clamping of the mechanism 71 the members 108 will be flexed toward the portions 100 and transmit the force to the strip member 102 for clamping the material 41 to the shoe 36. During the thermosetting of the cement, it may contract to a slight extent. Such a contraction without members 108a might tend to decrease the clamping pressure on the material 41 although such an arrangement has been used with satisfactory results. The provision of the members 108a are however, preferable and will provide for a more constant clamping force since any contraction of the cement will be compensated for by a slight flexing of the members 108a. Test results show no measurable amount of decrease of clamping pressure with the members 108a. When the handle 112 is moved to its extreme counterclockwise position against the stop pin 116, the pivot pin 122 will be forward of the line of centers through the pins 114 and 120, and the mechanism will stay in its locked clamped position. After the desired time has elapsed for the cementing of the brake-lining material 41 to the brake shoe 36, the handle 112 is moved in a clockwise direction whereby the yoke 94 is lifted away from the brake shoe 36 so that it may then be removed for use or storage.

It will be obvious that changes in temperature may be made by the adjusting knob 172 of the thermostat 130, that the mechanism may be adapted for use in applying brake lining materials to brake shoes having various diameters by the use of the proper adapter ring 140, that brake linings may be applied to brake shoes having various web widths by the proper positioning of the members 156 and 158, and that the locator 109 will position the brake-lining material in aligned position on the brake-shoe web 34.

What is claimed and is desired to be secured by United States Letters Patent is as follows:

1. In a mechanism of the character described, a base member, a heater element, a housing for said element having an outwardly facing surface corresponding in contour to the surface of a first element to be placed thereover, a rigid downwardly opening arcuate yoke, a flexible member adapted to engage and conform to the adjacent contour of a second element which is to be cemented to the first element, said flexible member being secured to the opposite end portions of said yoke, and a spring member operatively connected to exert a force between said yoke and said flexible member for controlling the force imparted to said flexible member by said yoke, and mechanism exerting a reactive force on said base member for applying a force to said yoke whereby said flexible member is operable to clamp the elements together and to said housing.

2. In a mechanism of the character described, a base member, a heater element, a housing for said element having an outwardly facing surface corresponding in contour to the surface of a first element to be placed thereover, a yoke, a flexible member adapted to engage a second element which is to be cemented to the first element, means for securing said flexible member at spaced points to said yoke, resilient means carried by said yoke at said spaced points and engageable with said flexible member at points intermediate the securement of said flexible member to said yoke, mechanism exerting a reactive force on said base member for applying a force to said yoke whereby said flexible member is operable to clamp the elements together and to said housing, and locking means for holding said mechanism in force-exerting position.

3. The combination of claim 2 in which said locking means comprises an overcenter toggle link.

4. In a mechanism for cementing brake linings to brake shoes, a base member, a pair of substantially semicylindrical hollow members carried by said base member in adjacent but spaced relation to each other whereby a brake shoe may be placed over said members with its flange portion received in the space between said hollow members, electrical heater elements positioned within said hollow members and held in intimate connecting relation therewith, a yoke, a flexible strip member carried at spaced portions by said yoke and adapted to be positioned against a brake lining for holding the same against the brake shoe, resilient means carried by said yoke at said spaced points and engageable with said flexible member at points intermediate the securement of said flexible member to said yoke, and means carried by said base member for holding said yoke in position to clamp said flexible member against said lining.

5. In a mechanism of the character described, a base member, a heater element, a housing for said element having an outwardly facing surface corresponding in contour to the surface of a first element to be placed thereover, a yoke, a flexible member adapted to engage a second element which is to be cemented to the first element, means for securing said flexible member at spaced points to said yoke, said means including a resilient element extending between said yoke and said flexible member and providing a lost motion connection to permit limited relative movement between said flexible member and said yoke; and mechanism exerting a reactive force on said base member for applying a force to said yoke whereby said flexible member is operable to clamp the elements together and to said housing.

6. An article of manufacture comprising a rigid member having spaced attaching portions, a flexible member extending between said spaced portions and secured thereto, and resilient members secured to said spaced portions and having force applying portions spaced from said rigid member and engaging said flexible member.

7. The combination of claim 6 in which said rigid member has a concave surface intermediate said spaced attaching portions.

8. The combination of claim 7 in which said resilient members force applying portions are provided with convex surfaces which engage said flexible member.

9. In a mechanism for cementing brake linings to brake shoes, a base member, a pair of substantially semicylindrical hollow members carried by said base member in adjacent but spaced relation to each other whereby a brake shoe may be placed over said members with its rib portion received in the space between said hollow members, electrical heater elements positioned within said hollow members and held in intimate contacting relation therewith, a rigid yoke, a flexible strip member carried at spaced portions by said yoke and adapted to be positioned against a brake lining for holding the same against the brake shoe, and means carried by said base member for holding said yoke in position to clamp said flexible member against said lining.

10. An electrically heated fixture for bonding a friction lining to the convex surface of the flange of a brake shoe having a web or rib portion comprising, a base, an anvil member carried by said base and having a convex surface with a circumferential recess therein adapted to receive the web or rib portion whereby such shoe flange may intimately engage said convex surface, an electrical heating element carried by said anvil member on the opposite side of said surface from such brake shoe flange whereby said surface prevents direct radiation from said element to such flange, a rigid yoke having spaced relatively fixed extending portions, said yoke being movable into straddle relation with such shoe whereby said spaced portions extend beyond the ends of such lining, a laterally flexible strip carried at its opposite end portions by said yoke portions and engageable with the outwardly facing surface of such lining, and clamping means for said yoke and carried by said base for holding said strip against such lining.

11. The combination of claim 10 in which said clamping means includes a hinge member pivotally carried by said base outwardly of one longitudinal edge of said anvil whereby said yoke may be bodily moved out of overlying relation with said anvil.

12. An electrically heated fixture for bonding a friction lining to the convex surface of the flange of a brake shoe having a web or rib portion comprising, a base, an anvil member carried by said base and having a convex surface with a circumferential recess therein adapted to receive the web or rib portion whereby such shoe flange may intimately engage said convex surface, an electrical heating element carried by said anvil member and positioned on the opposite side of said surface from such brake shoe flange for heating the flange, a postlike structure carried by said base and extending upwardly adjacent one lateral edge of said anvil, a rigid yoke having relatively fixed spaced extending portions movable into straddle relation with and adapted to extend beyond the ends of said lining, a flexible strip carried at its opposite end portions by said yoke portions and adapted to engage the outwardly facing surface of the lining, and a hinge member pivotally secured to said postlike structure laterally outwardly of said edge, means securing said yoke to said hinge member and clamping means for locking said hinge member in a rotated position whereby said strip is clamped against the lining.

13. An electrically heated fixture for bonding a friction lining to the convex surface of the flange of a brake shoe having a web or rib portion comprising, a base, an anvil member carried by said base and having an upwardly facing convex surface with a circumferential recess therein adapted to receive the web or rib portion whereby such shoe flange may intimately engage said convex surface, an electrical heating element positioned entirely within said anvil member for heating the flange, a postlike structure carried by said base and extending upwardly adjacent one lateral edge of said anvil, a rigid yoke having relatively fixed spaced downwardly extending portions arranged in straddle relation with and adapted to extend beyond the ends of said lining, a flexible strip carried solely at its opposite end portions by said yoke portions and adapted to engage the outwardly facing surface of such lining, and clamping means carried by said postlike structure and having its axis of movement transverse to said anvil, means securing a central section of said yoke to said clamping means whereby said strip may be clamped against the lining and removed therefrom in a direction transversely to said anvil for insertion and removal of brake shoes, and locating means carried by said postlike structure and projecting toward and overlying said anvil and engageable by such flange, said locating means adapted to extend outwardly of said anvil a distance greater than the thickness of such flange whereby such lining is engageable therewith for locating such lining relative to such flange.

14. An electrically heated fixture for bonding a friction lining to the convex surface of the flange of a brake shoe having a web or rib portion comprising, a base, a pair of semi-cylindrical member carried by said base to provide a pair of upwardly facing convex surfaces, said members being slightly spaced to provide a circumferential recess therebetween adapted to receive the web or rib portion whereby such shoe flange may intimately engage said convex surfaces, end walls closing the outer end surfaces of said members to provide a hollow closed housing except for said recess, an electrical heating element carried within said members and for heating said surfaces, a postlike structure carried by said base and extending upwardly adjacent one lateral edge of one of said members, a rigid yoke having relatively fixed spaced downwardly extending portions arranged in straddle relation with and extending beyond the ends of such lining, a flexible strip carried at its opposite end portions by said yoke portions and adapted to engage the outwardly facing surface of such lining, and clamping means carried by said postlike structure and having its axis of movement transverse to said anvil, and means securing a central section of said yoke to said clamping means whereby said strip may be clamped against such lining and removed therefrom in a direction transversely to said anvil for insertion and removal of such brake shoes.

15. An article of manufacture comprising an arc-shaped rigid member having a concave face and a convex face, and a pad portion carried at each end portion thereof, said member having an outwardly facing boss on each said pad portion adjacent said concave face, a pair of leaf springs having a deformed portion providing an outwardly facing convex surface portion and having an end portion, said end portions being individually positioned against said pad portions with said boss extending into said deformed portion, said deformed portions normally being spaced away from said bosses, a flexible member having a central section shaped to generally conform to said concave surface and having end portions extending around said spring convex surface portions and against said spring end portions, and means for clamping said end portions to the respective said pad portions with which they are associated.

16. An article of manufacture comprising a rigid member having spaced attaching portions, a flexible member extending between said spaced portions and secured thereto, and a resilient member secured to one of said spaced portions and having a force applying portion spaced from said rigid member and engaging said flexible member.

17. In a device of the character described, an anvil having an outwardly facing surface for supporting a first element, a pair of relatively movable force exerting members movable toward and away from said anvil for applying a clamping force to clamp a second element against such first element and against said anvil, one of said members including a rigid yoke having a pair of spaced force exerting portions immovable with respect to each other and serving to exert the entire clamping force to clamp such elements, and a lost motion force exerting means interposed between said relatively movable members to control the force exerted therebetween upon relative movement thereof.

18. The combination of claim 17 in which said lost motion means is a spring in which one portion of said spring abuts a first of said relatively movable members and another portion abuts a second of said relatively movable members.

19. In a device of the character described, an anvil having an outwardly facing surface for supporting a first element, a plurality of movable force exerting members movable toward and away from said anvil for applying a clamping force to clamp a second element against such first element and against said anvil, a first of said members including a rigid yoke having a pair of spaced force exerting portions immovable relative to each other, a second of said members comprising a flexible band having spaced portions secured to said first member portions, a third of said members being operatively connected to said first member, two of said plurality of force exerting members being relatively movable, and a resilient force exerting member interposed between said relatively movable members to exert a force therebetween upon relative movement thereof.

20. The combination of claim 19 in which said two members comprise said first and said second members.

21. In a mechanism of the character described, a base member, a first jaw member carried by said base member, a second jaw member cooperable with said first jaw member to clamp a workpiece therebetween, a yoke member having spaced portions immovable with respect to each other and serving as the sole means for transmitting force to said second jaw member, said yoke member being operatively connected to said base member and effective to exert a reactive force thereagainst to provide a clamping force for clamping such workpiece, and a lost motion force exerting connection between two of said members through which at least a portion of said clamping force is exerted.

22. The combination of claim 21 in which said second jaw member comprises a flexible member secured at opposite end portions to said yoke member portions.

23. The combination of claim 21 in which said lost motion connection comprises a spring interposed between said second jaw member and one of said yoke member spaced portions.

24. In a device of the character described, an anvil having an outwardly facing surface for supporting a first element, a clamp member movable toward and away from said surface of said anvil and adapted to clamp a second element against such first element whereby such elements may be held together, a force transmitting member movable relative to said anvil having spaced portions fixed to said clamp and intermediate portions movable relative to said clamp, means for moving said clamp and said force transmitting member to a selected position relative to said anvil, and force exerting means having mounting portions movable with said clamp and pressure portions movable independently of said clamp and anvil, said pressure portions being positioned to influence the position of said intermediate portions of said force transmitting member upon clamping movement of said clamp in relation to said anvil and independently of movement of said clamp relative to said anvil.

JOHN I. SPANICH.

REFERENCES CITED

The following references are of record in the file of this patent:

UNITED STATES PATENTS

| Number | Name | Date |
|---|---|---|
| 889,754 | Brown | June 2, 1908 |
| 1,872,692 | Drake | Aug. 23, 1932 |
| 2,122,554 | Brautigam | July 5, 1938 |
| 2,239,062 | Tallmadge | Apr. 22, 1941 |
| 2,402,252 | Kost | June 18, 1946 |
| 2,489,496 | O'Brien | Nov. 29, 1949 |